United States Patent [19]

Bartlett

[11] Patent Number: 5,608,273

[45] Date of Patent: Mar. 4, 1997

[54] BATTERY BACK-UP FOR ELECTRONIC CIRCUITS

[75] Inventor: Donald M. Bartlett, Fort Collins, Colo.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 796,992

[22] Filed: Nov. 25, 1991

[51] Int. Cl.$^6$ .................................................. H02J 9/06
[52] U.S. Cl. ................................. 307/64; 307/66; 307/72
[58] Field of Search .................................. 307/43, 64, 66, 307/72, 76, 85; 365/229

[56] References Cited

U.S. PATENT DOCUMENTS

| | | |
|---|---|---|
| Re. 32,200 | 7/1986 | Lee et al. .................................. 365/229 |
| 4,617,473 | 10/1986 | Bingham .................................... 307/66 |
| 4,677,311 | 6/1987 | Morita ....................................... 307/66 |
| 4,740,542 | 11/1987 | Hwang ....................................... 307/66 |
| 4,831,595 | 5/1989 | Bone ......................................... 365/229 |
| 4,908,790 | 3/1990 | Little et al. ............................... 307/66 |
| 5,160,851 | 11/1992 | McAndrews ................................ 307/66 |

*Primary Examiner*—Fritz Fleming
*Attorney, Agent, or Firm*—Wayne P. Bailey; Paul W. Martin

[57] ABSTRACT

The invention concerns battery back-up for electronic equipment. A sensor detects a drop in power supply voltage and, in response, connects the back-up battery to the equipment, via a Field-Effect Transistor (FET). The FET causes a lower voltage drop between the battery and the equipment, as compared with a commonly used alternative, namely, a diode.

6 Claims, 4 Drawing Sheets

5,608,273

BATTERY BACK-UP FOR ELECTRONIC CIRCUITS

The invention concerns circuitry which switches a battery into operation when the power supply of an electronic device fails.

BACKGROUND OF THE INVENTION

Power supplies for electronic equipment can fail. A common approach to protecting against such failures is to provide a battery back-up. One type of battery back-up is shown in FIG. 1.

In this back-up system, a diode is connected from a back-up battery to the equipment. The diode polarity is such that, when the power supply voltage, $V_{POWER}$, is normal, the diode is reverse-biased (because the battery voltage, $V_{BATTERY}$, is below $V_{POWER}$), and thus the diode acts as an open circuit. However, when $V_{POWER}$ drops below $V_{BATTERY}$ by a sufficient amount, such as 0.7 volts, the diode becomes conducting, and the battery now supplies power to the equipment.

While this approach works well in many situations, it does have disadvantages. For example, a voltage drop exists across the diode, such as the 0.7 volts (for a silicon device) discussed above. Consequently, if it is desired that the back-up voltage which is actually delivered to the equipment remain equal to $V_{POWER}$, the battery must deliver a voltage which is high enough to compensate for the voltage drop across the diode. In this example, $V_{BATTERY}$ must exceed $V_{POWER}$ by 0.7 volts. Batteries having such fractional ratings can be expensive and hard-to-find.

Further, it is not even clear that such an arrangement is workable. That is, if $V_{BATTERY}$ exceeds $V_{POWER}$ by 0.7 volts, the diode will be conducting even when the power supply is functional. To inhibit the conduction of the diode, the differential between $V_{BATTERY}$ and $V_{POWER}$ must be reduced or eliminated. In practice, many designers reduce the differential by setting $V_{BATTERY}$ equal to $V_{POWER}$. However, the reduction also reduces the back-up voltage received by the equipment: when the power supply fails, the voltage delivered to the equipment will equal $V_{BATTERY}$ minus the diode drop. If $V_{BATTERY}$ equals 9 volts, then the voltage delivered to the equipment upon power supply failure will be about 8.3 volts. This lowered voltage can be undesirable in some cases.

OBJECTS OF THE INVENTION

It is an object of the invention to provide an improved battery back-up.

SUMMARY OF THE INVENTION

In one form of the invention, a detector detects when power supply voltage drops below an allowable threshold. The detector turns ON an FET in response, which connects a battery to the electronic equipment.

DETAILED DESCRIPTION OF THE INVENTION

Figure 2:
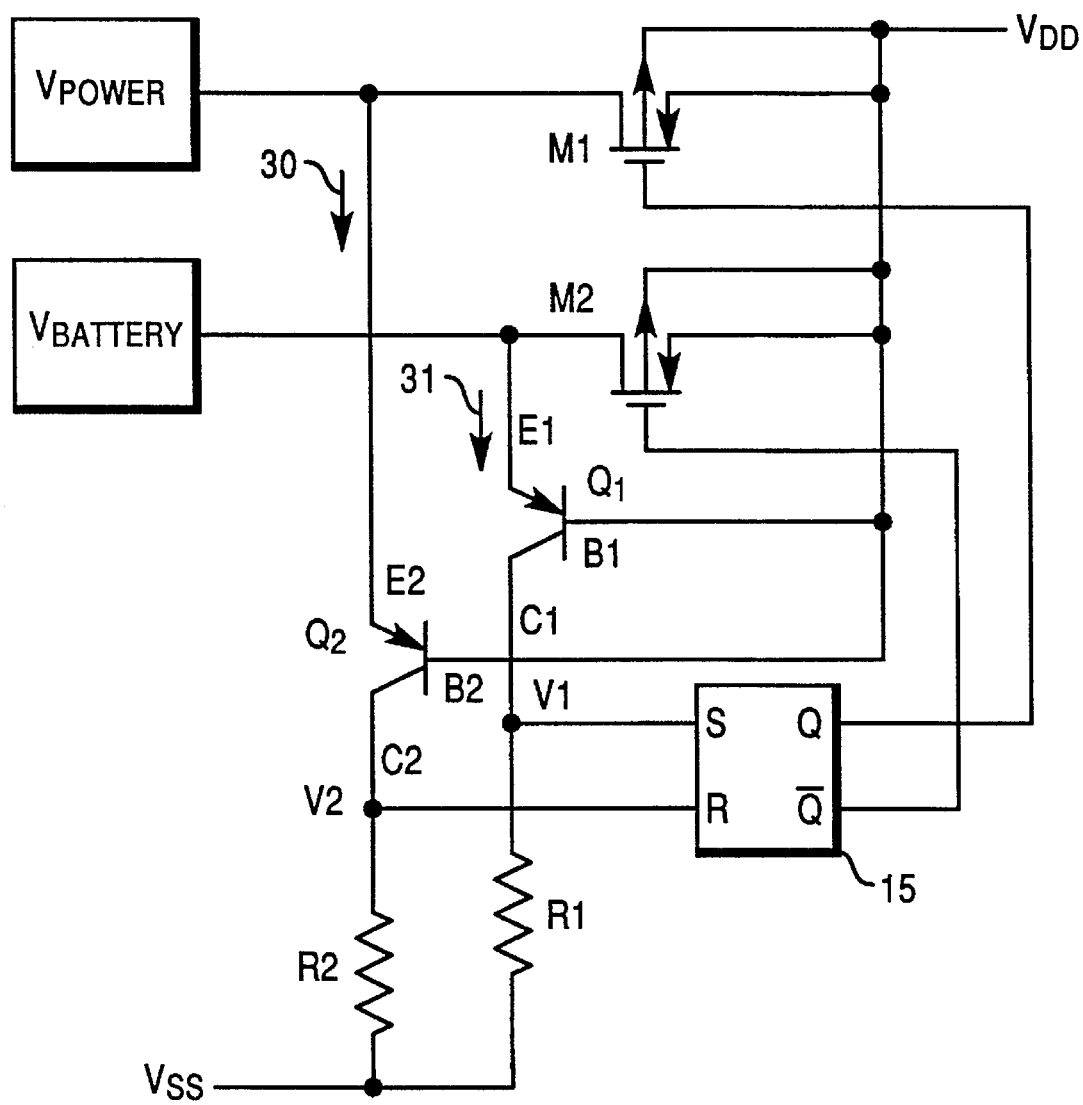
FIG. 2 illustrates one form of the invention.

FIG. 2 illustrates one form of the invention. It may be simplest to begin the explanation with the flip-flop 15. The flip-flop is in one of two opposite states:

STATE 1: S is HIGH and R is LOW, wherein Q is HIGH and $\overline{Q}$ is LOW.

STATE 2: S is LOW and R is HIGH, wherein Q is LOW and $\overline{Q}$ is HIGH.

The flip-flop controls which of FETs M1 or M2 is conducting, as the following example will show.

EXAMPLE

Normal Operation: Power Supply, not Battery, Supplies Power

Figure 3:
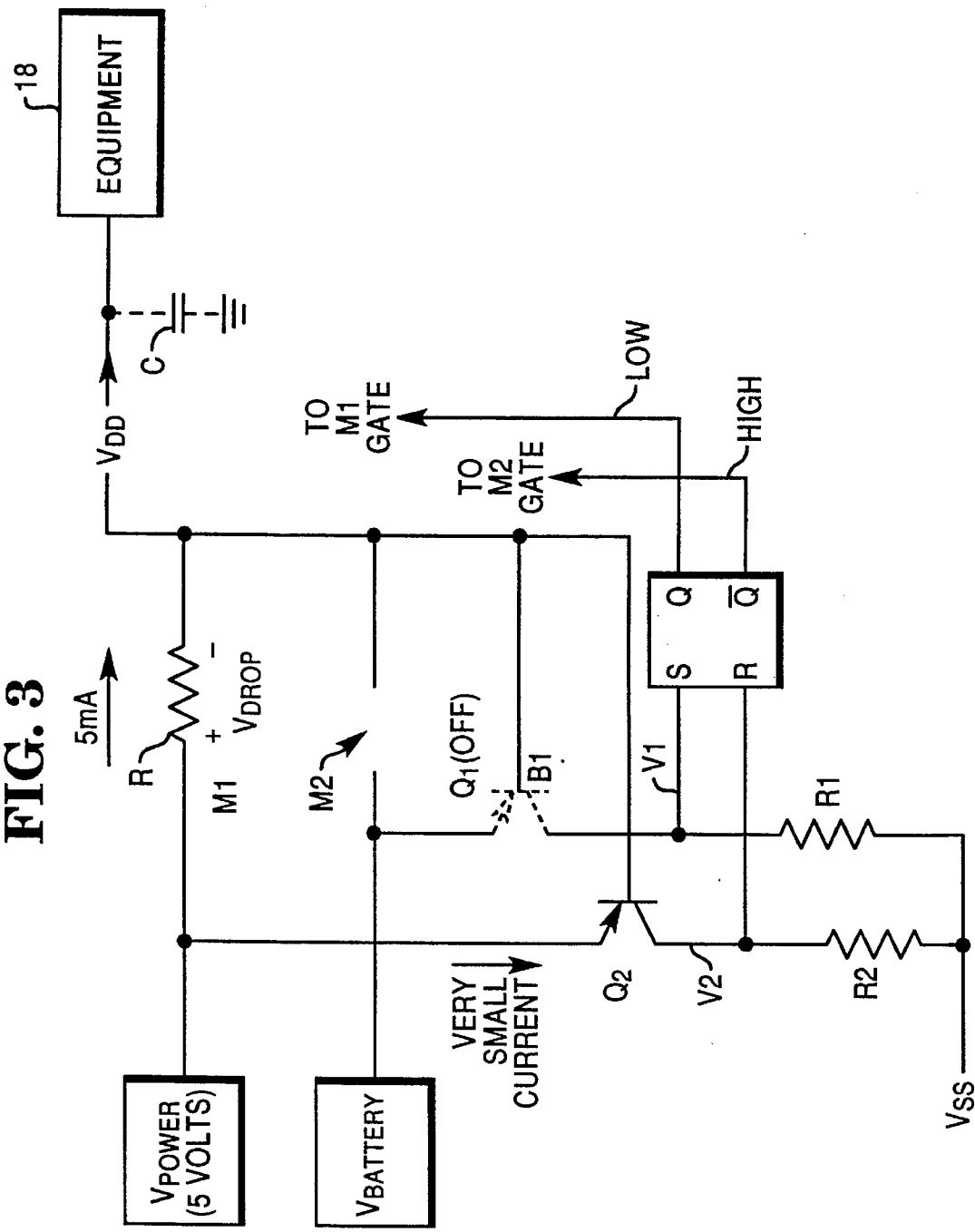
FIGS. 3 and 4 are simplifications of FIG. 2.

During normal operation, the flip-flop 15 is in State 2. The situation is shown in FIG. 3. Q is LOW and $\overline{Q}$ is HIGH. Q turns OFF M2 (indicated by an open circuit in FIG. 3) and $\overline{Q}$ turns M1 ON (indicated by a resistor R).

M1 and M2 are p-channel, enhancement-mode MOSFETs. In the ON state, caused by a LOW voltage applied to the gate (with respect to the source), they exhibit a low channel resistance: they act as low-valued resistors, as indicated by resistor R in FIG. 3. In the OFF state, caused by a HIGH gate voltage, they exhibit a high channel resistance: they act as open circuits.

Consequently, since Q (now LOW) feeds the gate of M1, M1 is ON. M1 supplies the current required by the equipment, by way of the terminal Vdd. In particular, M1 passes about 5 milliamps of current, as indicated in FIG. 3, with a voltage drop ($V_{DROP}$) of about 200–300 millivolts. Conversely, M2 is OFF (i.e., an open circuit) at this time, because $\overline{Q}$ feeds a HIGH signal to its gate.

Because of the voltage drop across M1, Vdd is near 4.7 or 4.8 volts (the voltage will be assumed to be 4.75 volts). This voltage has slightly different effects on Q1 and Q2. Q1 is held in the inactive mode: the base-emitter junction of Q1 is reverse-biased (the emitter is at 3 volts, and the base is at 4.75 volts, which is the potential of Vdd). In contrast, Q2 is held slightly in conduction: its base-emitter junction is slightly forward-biased (the emitter is at 5 volts, and the base is at 4.75 volts.)

These states of Q1 and Q2 cause both V1 and V2 to be at logic LOW states. Thus, V1 and V2 are not presently controlling the state of the flip-flop. Instead, the flip-flop's state is determined by history: the last HIGH signal appearing at R or S determines the present state of the flip-flop. It will now be shown that, because of events occurring during power-up of the system, the present state will be State 2.

Power-Up Induces State 2

The equipment 18 in FIG. 3, which receives its power from the lead Vdd, inevitably has some capacitance, indicated by capacitor C. (If the natural capacitance is, for some reason insufficient, a 20 pF capacitor can be added.) This capacitance will tend to hold Vdd at a lower voltage than $V_{POWER}$ during power up: Vdd will lag $V_{POWER}$. The power-up sequence can be explained by reference to FIG. 4, in which the FETs have been omitted.

There are two possible cases. Case 1: the flip-flop is in State 1, in which M2 is ON, applying $V_{BATTERY}$ to lead Vdd. Case 2: the flip-flop is in STATE 2, in which M1 is ON, applying $V_{POWER}$ to lead Vdd. Case 1 will be considered first.

Case 1: M2 is ON at Start of Power-up

As $V_{POWER}$ climbs from zero volts to 5 volts, the bases B1 and B2 of both transistors Q1 and Q2 are also rising as $V_C$ rises. $V_C$ is rising because of current fed through M2.

Assume, for explanation, that $V_{POWER}$ stops climbing at one diode drop above $V_{BATTERY}$ (i.e., stops at about 3.7 volts, as indicated in the plot 25). Since $V_C$ is rising, at some instant, $V_C$ will reach $V_{BATTERY}$, minus the 200 or 300 millivolt drop across M2, and thus reach a voltage of 2.7 or 2.8 volts. At this instant, Q2 passes very little current, because the emitter-base voltage is only 200 or 300 millivolts, and thus V2 is almost zero.

However, in contrast, Q1 has a base-emitter voltage of about (3.7–Vdd). Since Vdd is about 2.7 or 2.8 volts, the base-emitter voltage of Q1 is very large. Q1 is thus heavily driven into conduction, and V1 is consequently very large, applying a HIGH signal to the R-input of the flip-flop, driving the flip-flop into State 2.

Now, M1 is forced ON, connecting the Vdd-line to $V_{POWER}$. $V_{POWER}$ supplies current, as required in normal operation.

Case 2: M1 is ON at the Start of Power-up

In this case, the flip flop starts up in State 2, and no events occur to change its status. M1 continually connects $V_{POWER}$ to the Vdd lead.

Figure 4:
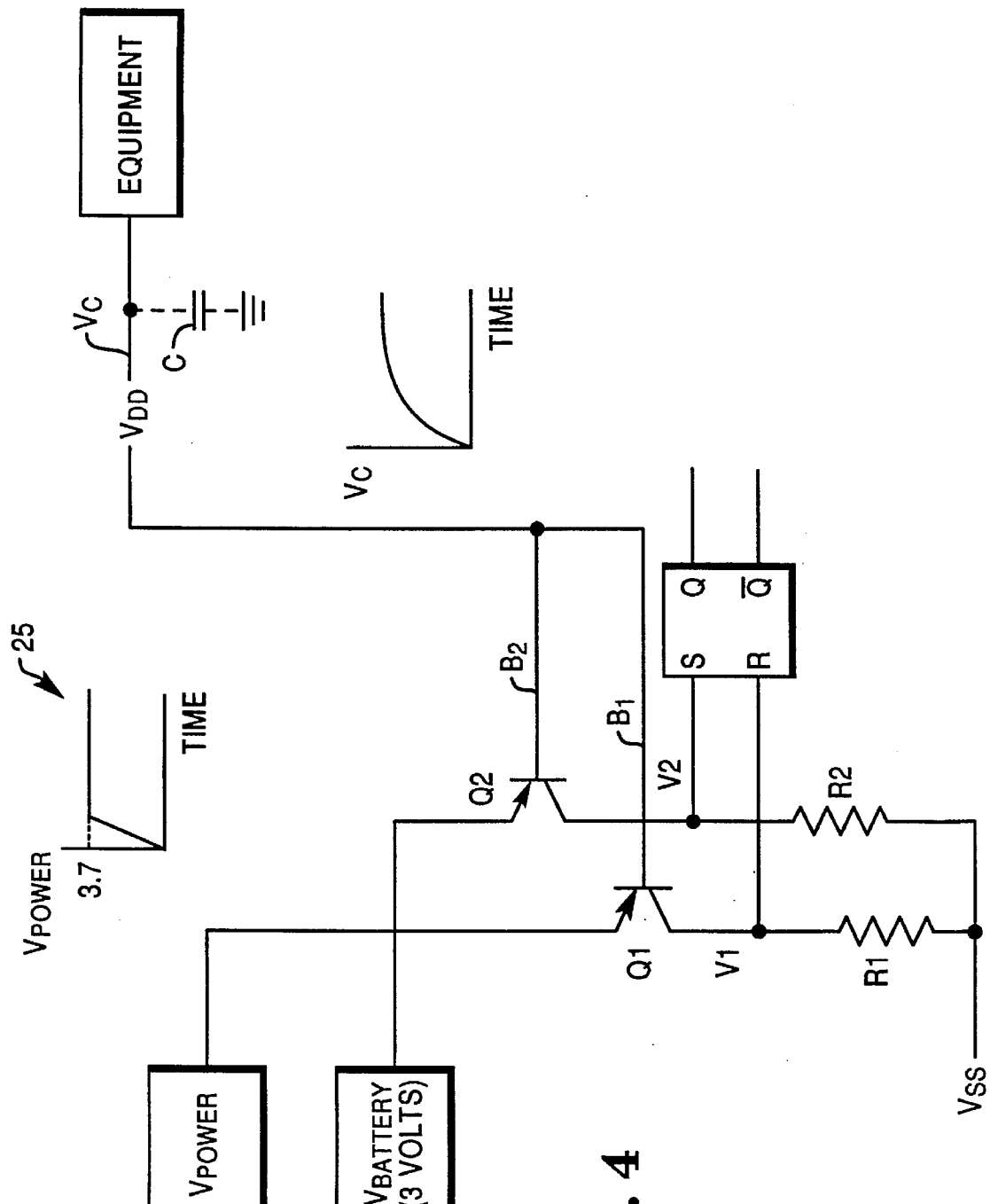

Therefore, no matter what state the flip-flop starts in, during power-up, the capacitance C in FIGS. 3 and 4 causes the flip-flop to reside in State 2 at the end of the power-up transition.

It was assumed in Cases 1 and 2 that $V_{POWER}$ stopped and held at 3.6 volts. This stoppage was postulated for purposes of explanation. In fact, $V_{POWER}$ climbs directly to 5 volts, and does not stop. Nevertheless, the explanation given above still applies: If Q2 was initially ON, Q2 becomes shut off at some instant during power-up, and Q1 becomes highly conducting, thereby pulling V2 LOW and V1 HIGH, thus driving the flip-flop into State 2.

This discussion will now consider the transition to battery back-up status.

Power Supply Fails

In FIG. 2, if $V_{POWER}$ falls to a single diode drop beneath $V_{BATTERY}$, Vdd is pulled below $V_{E1}$, turning on Q1. V1 is pulled HIGH, pulling the S input HIGH, driving the Flip-flop into State 1. Now, M2 is driven ON, pulling Vdd to about 2.75 volts (i.e., 3 volts minus the IR drop across the FET, which is the same as that across M1.)

Significant Features

Several important features of the invention are the following.

Figure 1:
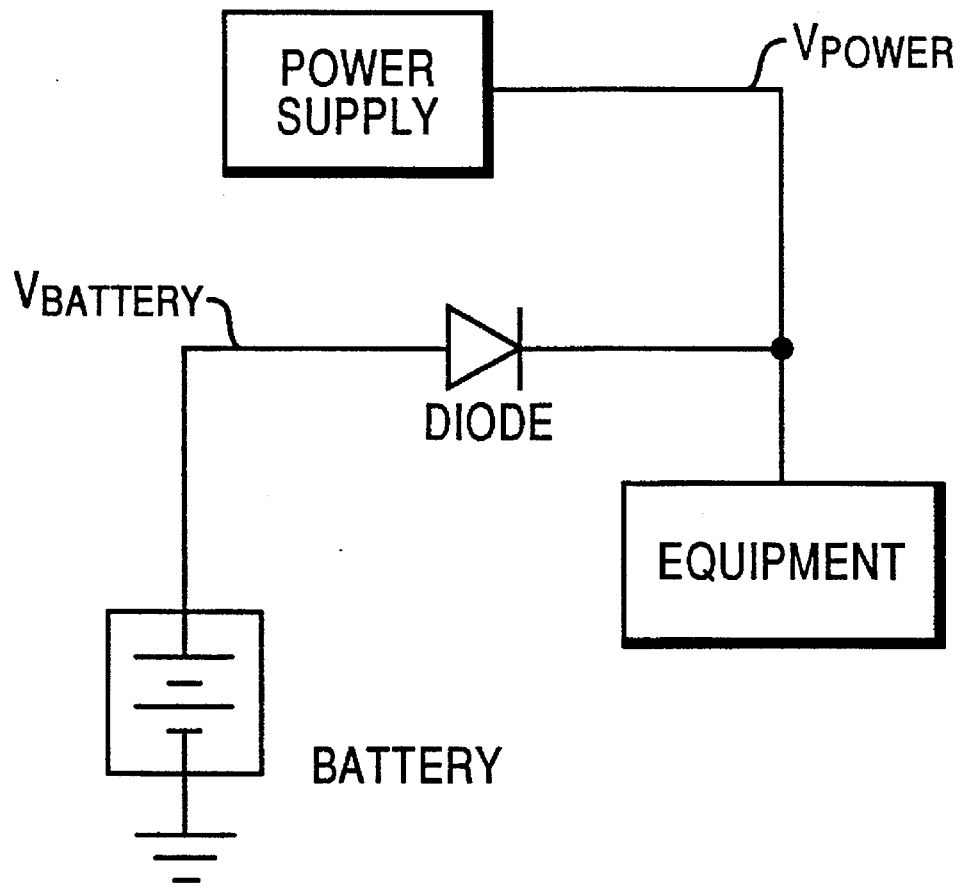
FIG. 1 illustrates a prior-art battery back-up system.

One. The back-up voltage applied to the equipment is equal to $V_{BATTERY}$ minus the IR (I is current, R is resistance) drop across M2. This drop will be about 200 to 300 millivolts, for a current of 5 milliamps. This drop is less than one-half the drop occurring in the diode in the prior-art system of FIG. 1. Thus, not only is a higher back-up voltage applied to the equipment, but the power dissipated in M2 is less than half that dissipated in a comparable silicon diode. (The power dissipated in M2 equals current×voltage drop. For equal currents, the voltage drop in M2 is less than half that in the diode in FIG. 1.)

Two. There is a momentary drop in voltage on line Vdd, at the instant when $V_{POWER}$ drops below $V_{BATTERY}$, and before M2 is switched ON. However, this drop is considered insignificant, as it lasts for only about 2 micro-seconds. That is, the voltage received by the equipment, namely, the voltage on Vdd, momentarily drops to a first value, at which time the flip-flop switches states, and drives M2 into conduction, thereby pulling Vdd to a higher voltage.

Three. During normal operation, when the power supply is functioning properly, the circuit of Figure is consuming an insignificant amount of current. That is, currents 30 and 31 in FIG. 2 total less than about 1 micro-amp. The primary reasons for the low current consumption are (1) Q2 is OFF, (2) Q1 is barely conducting ($V_{BE}$ is about 0.2 volts), and (3) the remaining components, including the flip-flop, are FET devices, which are all OFF.

Numerous substitutions and modifications can be undertaken without departing from the true spirit and scope of the invention. What is desired to be secured by Letters Patent is the invention as defined in the following claims.

I claim:

1. A system for connecting a battery to a load when a power supply for the load fails, comprising:
   a) a switch leading from a battery to the load;
   b) a flip-flop which has an output which controls the switch;
   c) means for biasing the flip-flop, during normal operation of the power supply, into a state causing the switch to be OFF; and
   d) means for detecting a voltage drop of the power supply and, in response, changing the state of the flip-flop such that the switch turns ON.

2. A battery back-up system for a power supply, comprising:
   a) a first switch leading from the power supply to a load, and a second switch leading from the battery to the load;
   b) a flip-flop having outputs Q and $\overline{Q}$, each controlling a respective switch;
   c) a comparator for comparing power supply voltage, $V_{POWER}$, with battery voltage, $V_{BATTERY}$, and if $V_{BATTERY}$ exceeds $V_{POWER}$ by a predetermined amount, changing the outputs of the flip-flop such that the first switch is OFF and the second switch is ON.

3. Apparatus according to claim 2 in which the comparator comprises a pair of p-n-p bipolar junction transistors.

4. A battery back-up system for a power supply, comprising:
   a) a flip-flop, having outputs Q and $\overline{Q}$;
   b) a switch, M1, actuated by Q and connecting between the power supply and a terminal;
   c) a switch, M2, actuated by $\overline{Q}$ and connecting between the battery and the terminal; and
   d) means for
      i) causing Q to actuate M1 when the power supply voltage exceeds the battery voltage, and
      ii) causing $\overline{Q}$ to actuate M2 when the battery voltage exceeds the power supply voltage.

5. A power supply for equipment, comprising:
   a) a primary power supply lead ("PRIMARY LEAD");
   b) a back-up power supply lead ("BACK-UP LEAD");
   c) a low voltage lead ("Vss LEAD");
   d) first and second resistors, each having one lead connected to the Vss lead;

e) a power supply lead ("Vdd LEAD") leading to the equipment;

f) a first FET ("FET-1") having its channel connecting between the PRIMARY LEAD and the Vdd LEAD;

h) a second FET having its channel connecting between the BACK-UP LEAD and the Vdd LEAD;

i) a first PNP transistor ("Q1") having
   i) its base connected to the Vdd LEAD;
   ii) its emitter connected to the PRIMARY LEAD; and
   iii) its collector connected the second lead of the first resistor;

j) a second PNP transistor having
   i) its base connected to the the Vdd lead;
   ii) its emitter connected to the back-up lead; and
   iii) its collector connected to the second lead of the second resistor; and k) an RS flip-flop, having
   i) its R input connected to C1;
   ii) its S input connected to C2;
   iii) its Q output connected to the gate of FET1;
   iv) its $\overline{Q}$ output connected to the gate of FET2, wherein FET1 connects the primary lead to the Vdd lead, until the voltage of the primary lead falls one diode drop below that of E1, at which time the flip-flop turns FET1 OFF and turns FET2 ON, thereby pulling the Vdd lead to the voltage at E1.

6. Apparatus according to claim 4 in which the switch comprises a p-channel, enhancement-mode field-effect transistor.

* * * * *